United States Patent
Komatsu (10) Patent No.: US 9,213,813 B2
(45) Date of Patent: Dec. 15, 2015

(54) AUTHENTICATION DEVICE, AUTHENTICATION METHOD, AND RECORDING MEDIUM

(71) Applicant: FUJITSU LIMITED, Kawasaki-shi, Kanagawa (JP)

(72) Inventor: Kiyoshi Komatsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 183 days.

(21) Appl. No.: 13/974,721

(22) Filed: Aug. 23, 2013

(65) Prior Publication Data

US 2014/0068757 A1  Mar. 6, 2014

(30) Foreign Application Priority Data

Sep. 3, 2012 (JP) ................. 2012-193261

(51) Int. Cl.
*G06F 21/31* (2013.01)
*H04L 29/06* (2006.01)

(52) U.S. Cl.
CPC .............. *G06F 21/31* (2013.01); *H04L 63/083* (2013.01)

(58) Field of Classification Search
CPC ............................. G06F 21/31; H04L 63/083
See application file for complete search history.

(56) References Cited

U.S. PATENT DOCUMENTS

| | | | | |
|---|---|---|---|---|
| 7,386,892 B2* | 6/2008 | Gilfix et al. | ...................... | 726/28 |
| 7,523,499 B2* | 4/2009 | Wilkins et al. | .................. | 726/23 |
| 7,536,642 B2* | 5/2009 | Wilbrink et al. | .............. | 715/255 |
| 7,793,335 B2* | 9/2010 | Bali | ......................... | G06F 21/55 |
| | | | | 380/277 |
| 7,870,491 B1* | 1/2011 | Henderson et al. | ........... | 715/745 |
| 8,145,913 B1* | 3/2012 | Zaitsev | .......................... | 713/183 |
| 8,412,931 B2* | 4/2013 | Vedula et al. | .................. | 713/161 |
| 2005/0086507 A1 | 4/2005 | Shoji et al. | | |
| 2005/0149763 A1* | 7/2005 | Nakao | ........................... | 713/202 |

(Continued)

FOREIGN PATENT DOCUMENTS

| | | |
|---|---|---|
| JP | 09-212723 A | 8/1997 |
| JP | 2009-169615 A | 7/2009 |
| JP | 2011-059880 A | 3/2011 |
| WO | 03/069491 A1 | 8/2003 |

OTHER PUBLICATIONS

Alghathbar, Khaled, and Hanan Mahmoud. "Noisy password scheme: A new one time password system." Electrical and Computer Engineering, 2009. CCECE'09. Canadian Conference on. IEEE, 2009: (pp. 841-846).*

(Continued)

*Primary Examiner* — Kari Schmidt
(74) *Attorney, Agent, or Firm* — Maschoff Brennan (57) ABSTRACT

An authentication device includes an authentication unit configured to determine whether an input password input to a input unit matches a registered password registered in advance in a storage unit, count the number of times it is determined that the input password does not match the registered password, and stops authentication using a password if the number of times a mismatch is determined reaches a specified number, and a management unit configured to create an input error list supporting each of characters, digits, or other elements included in the registered password, on the basis of a history of errors of input to the input unit, and configured to cancel counting in a case where it is determined by the authentication unit that the input password does not match the registered password and a cause of the mismatch lies in an input error included in the input error list.

9 Claims, 11 Drawing Sheets

(56) References Cited

U.S. PATENT DOCUMENTS

| | | | |
|---|---|---|---|
| 2007/0061864 A1* | 3/2007 | Bali et al. | 726/2 |
| 2007/0101150 A1* | 5/2007 | Oda | 713/183 |
| 2009/0259588 A1* | 10/2009 | Lindsay | 705/40 |
| 2010/0115583 A1* | 5/2010 | Delia et al. | 726/2 |

OTHER PUBLICATIONS

Frykholm, Niklas, and Ari Juels. "Error-tolerant password recovery." Proceedings of the 8th ACM conference on Computer and Communications Security. ACM, 2001: (pp. 1-9).*

* cited by examiner

| NUMBER OF CHARACTERS n | 1 | 2 | 3 | 4 | 5 | ... | N |
|---|---|---|---|---|---|---|---|
| INPUT CHARACTER M | (m, 1) | (m, 2) | (m, 3) | (m, 4) | (m, 5) | ... | (m, N) |

18A

| NUMBER OF CHARACTERS n | 1 | 2 | 3 | 4 | 5 | ... | N |
|---|---|---|---|---|---|---|---|
| INPUT CHARACTER M | (m, 1) | (m, 2) | (m, 3) | (m, 4) | (m, 5) | ... | (m, N) |
| ERRONEOUSLY INPUT CHARACTER p | (p, 1) | (p, 2) | (p, 3) | (p, 4) | (p, 5) | ... | (p, N) |

"D" AFTER BS (BACKSPACE) AND "X" BEFORE BS ARE RECORDED IN A PAIRED MANNER

| NUMBER OF CHARACTERS n | 1 | 2 | 3 | 4 | 5 | ... | N |
|---|---|---|---|---|---|---|---|
| INPUT CHARACTER t | (t, 1) | (t, 2) | (t, 3) | (t, 4) | (t, 5) | ... | (t, N) |

(1) COMPARE REGISTERED PASSWORD WITH INPUT PASSWORD FOR EACH CHARACTER FROM TOP (2) IN THE CASE OF INPUT ERROR, VERIFY TARGET CHARACTER PAIR AGAINST "INPUT ERROR MANAGEMENT DATABASE"

(3) REGISTERED→"INPUT ERROR NOT TO BE COUNTED"
NOT REGISTERED→"INPUT ERROR TO BE COUNTED"

AUTHENTICATION DEVICE, AUTHENTICATION METHOD, AND RECORDING MEDIUM

CROSS-REFERENCE TO RELATED APPLICATION

This application is based upon and claims the benefit of priority of the prior Japanese Patent Application No. 2012-193261, filed on Sep. 3, 2012, the entire contents of which are incorporated herein by reference.

FIELD

The embodiments discussed herein are related to an authentication device, an authentication method, and a recording medium.

BACKGROUND

Authentication processing using a password is performed in various devices, such as personal computers, mobile phones, automated teller machines (ATMs) of banks, and various types of integrated computers. In such devices, when a password mismatch has occurred a specified number of times, processing such as password invalidation and stopping authentication during the day of the password mismatch is performed in some cases. This inhibits a malicious third party from discovering a password by trial and error and achieving unauthorized access to a device. Reducing the specified number results in improvement in security level. It is, however, conceivable that a legitimate user repeatedly enters an incorrect password. Therefore, the convenience of a user would be impaired if the specified number is excessively reduced.

There is known a personal information transaction device in which the relationship between each digit and the next digit in a touch panel is stored, and if the number of times a user presses the next digit by mistake is within a permissible range, that number of times is not included in the count of the specified number and the user is allowed to again input a password.

There is also known a password verification device in which if an input password contains an incorrect entry and the incorrect entry matches the immediately previous incorrect entry, the incorrect entry is not counted.

The above personal information transaction device determines on the basis of a key arrangement in an input unit whether an incorrect entry is a mere incorrect entry. It is, therefore, impossible in some cases to sufficiently enhance convenience. This is because characters and digits that are likely to be incorrectly input vary depending on users, and not all the characters and digits located next to each other are likely to be incorrectly input. Also, keys located next to each other include both those that are likely to be incorrectly input and those that are not.

Also, the above password verification device simply does not count an incorrect entry on the basis of the relationship to an incorrect entry made immediately before. This does not sufficiently reflect characters and digits that are likely to be incorrectly input by a user. For this reason, it is impossible in some cases to sufficiently enhance convenience.

Japanese Laid-open Patent Publication No. 9-212723 and Japanese Laid-open Patent Publication No. 2011-59880 disclose examples of the related art.

SUMMARY

According to an aspect of the embodiments, an authentication device includes an input unit configured to accept input, an authentication unit configured to determine whether an input password input to the input unit matches a registered password registered in advance in a storage unit, count the number of times it is determined that the input password does not match the registered password, and stops authentication using a password if the number of times a mismatch is determined reaches a specified number, and a management unit configured to create an input error list supporting each of characters, digits, or other elements included in the registered password, on the basis of a history of errors of input to the input unit, and cause the list to be stored in the storage unit, and configured to cancel counting in a case where it is determined by the authentication unit that the input password does not match the registered password and a cause of the mismatch lies in an input error included in the input error list.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of the present disclosure will be described with reference to the accompanying drawings.

Embodiments

Hereinafter, an authentication device, an authentication method, and an authentication program will be described with reference to the drawings. The authentication device, authentication method, and authentication program of the present disclosure, which are applicable to various devices, such as personal computers and mobile phones, ATMs of banks, and various types of integrated computers, are assumed to be applied to a personal computer in the below description.

First Embodiment

Figure 1:
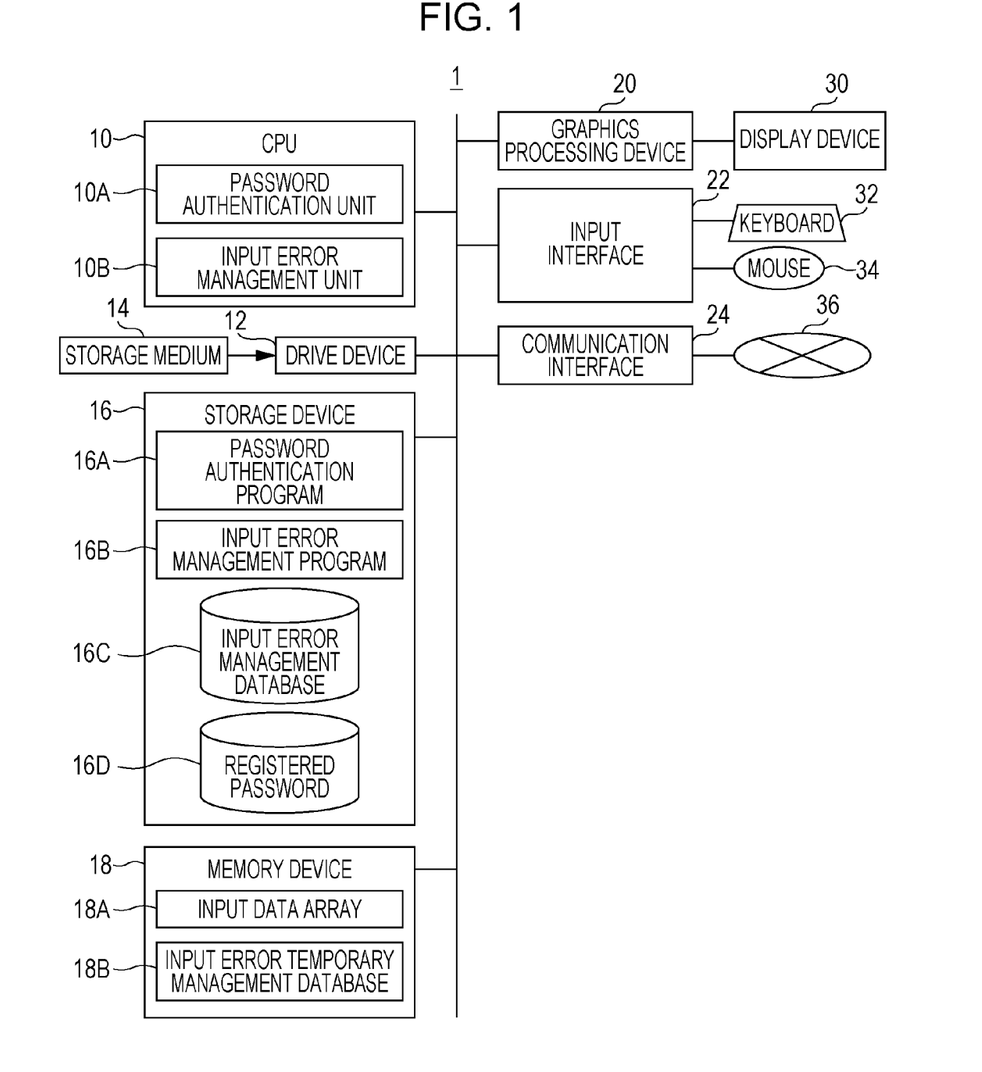
FIG. 1 illustrates an example of a configuration of an authentication device according to a first embodiment.

An authentication device 1 according to a first embodiment will be described below. FIG. 1 illustrates an example of a configuration of the authentication device 1 according to the first embodiment. The authentication device 1 includes a central processing unit (CPU) 10, a drive device 12, a storage device 16, a memory device 18, a graphics processing device 20, an input interface 22, and a communication interface 24, for example. These components are connected, for example, through a bus.

The CPU 10 is, for example, a processor as an arithmetic processing unit including a program counter, an instruction decoder, various computing units, a load-store unit (LSU), a general register, and so forth.

The drive device 12 is a device capable of reading programs and data from a storage medium 14. When the storage medium 14 in which programs are recorded is inserted in the drive device 12, the programs from the storage medium 14 are installed in the storage device 16 through the drive device 12. The storage medium 14 is, for example, a portable storage medium such as a compact disc (CD), a digital versatile disc (DVD), and a universal serial bus (USB) memory.

The storage device 16 is a hard disk drive (HDD) or a flash memory, for example. Programs such as a password authentication program 16A and an input error management program 16B, and data such as an input error management database 16C and a registered password 16D are stored in the storage device 16. Note that the password authentication program 16A and the input error control program 16B do not have to be programs that are clearly separate.

In addition to the use of the storage medium 14 as mentioned above, programs may be installed in such a way that the communication interface 24 downloads programs through the network 36 from another computer and installs the programs in the storage device 16. The network 36 is the Internet, a local area network (LAN), a wireless network, or the like. The programs may be stored in advance in the storage device 16, a read only memory (ROM), or the like at the time of shipment of the authentication device 1.

The programs installed or stored in advance in such a way, when executed by the CPU 10, cause an information processing device in the form illustrated in FIG. 1 to be able to function as the authentication device 1 of this embodiment.

The memory device 18 is a random access memory (RAM) or an electrically erasable and programmable read only memory (EEPROM), for example. Data such as an input data array 18A and an input error temporary management database 18B are stored in the memory device 18.

The graphics processing device 20 is connected to a display device 30 and generates a screen to be displayed by the display device 30. A keyboard 32, a mouse 34, and other input devices are connected to the input interface 22.

Here, in the case where the authentication device 1 is connected to a device other than a personal computer, the input interface 22 is connected to ten keys, a touch panel (some personal computers are provided with touch panels), and other input devices.

The authentication device 1 includes a password authentication unit 10A and an input error management unit 10B as functional blocks that function when the CPU 10 executes programs stored in the storage device 16. It is unnecessary for these functional blocks to be implemented by clearly separated programs. The functional blocks may be subroutines or functions that are called by other programs. It is also acceptable that some of the functional blocks are hardware units such as a large scale integrated (LSI) circuit, an integrated circuit (IC), and a field programmable gate array (FPGA).

The password authentication unit 10A is activated, for example, upon logging into the authentication device 1, and determines whether a password input (hereinafter referred to as an "input password") by using the keyboard 32 and the input interface 22 matches a password registered in advance (hereinafter referred to as a "registered password") in the storage device 16. Then, the password authentication unit 10A counts the number of times it is determined that the input password does not match the registered password, and stops the authentication using a password when the number of times it is determined that the passwords do not match reaches a specified number T.

The input error management unit 10B creates and updates an input error management database 16C on the basis of a history of a user's input to the keyboard 32 and the input interface 22. If it is determined by the password authentication unit 10A that an input password and the registered password do not match, and the cause of the mismatch lies in an input error registered in the input error management database 16C, the input error management unit 10B cancels counting of the input for which the above negative determination is made.

The contents of processes of the password authentication unit 10A and the input error management unit 10B will be described hereinafter with reference to flowcharts.

Figure 2:
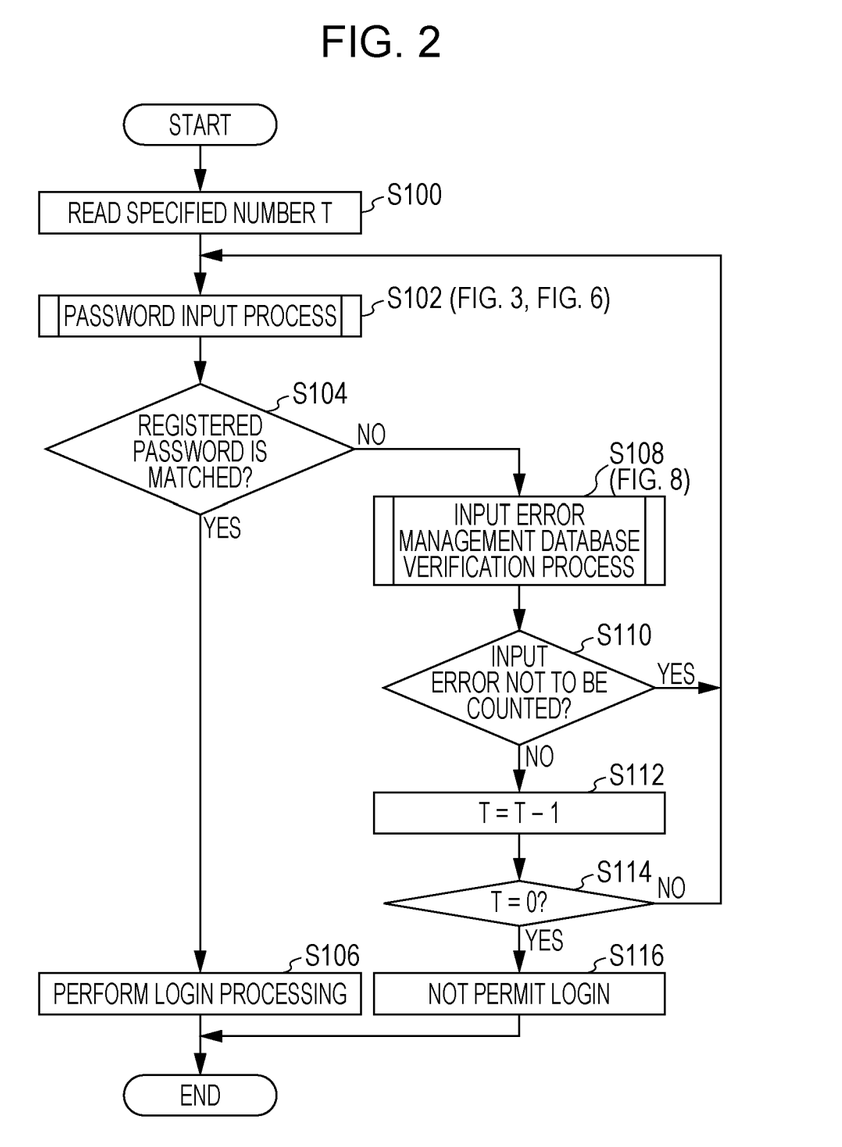
FIG. 2 is an example of a flowchart illustrating the flow of a process performed by the authentication device.

FIG. 2 is an example of a flowchart illustrating the flow of a process performed by the authentication device 1. The process of the flowchart of FIG. 2 is performed, for example, when the authentication device 1 is activated and a user is going to log in. Note that the order in which the process is performed in each of the flowcharts illustrated below may be changed to any order as long as the same processing result is obtained.

First, the authentication device 1 reads the value T for counting a specified number of mismatch determinations from the storage device 16, a ROM, or the like (S100). The value T is a positive integer.

Figure 3:
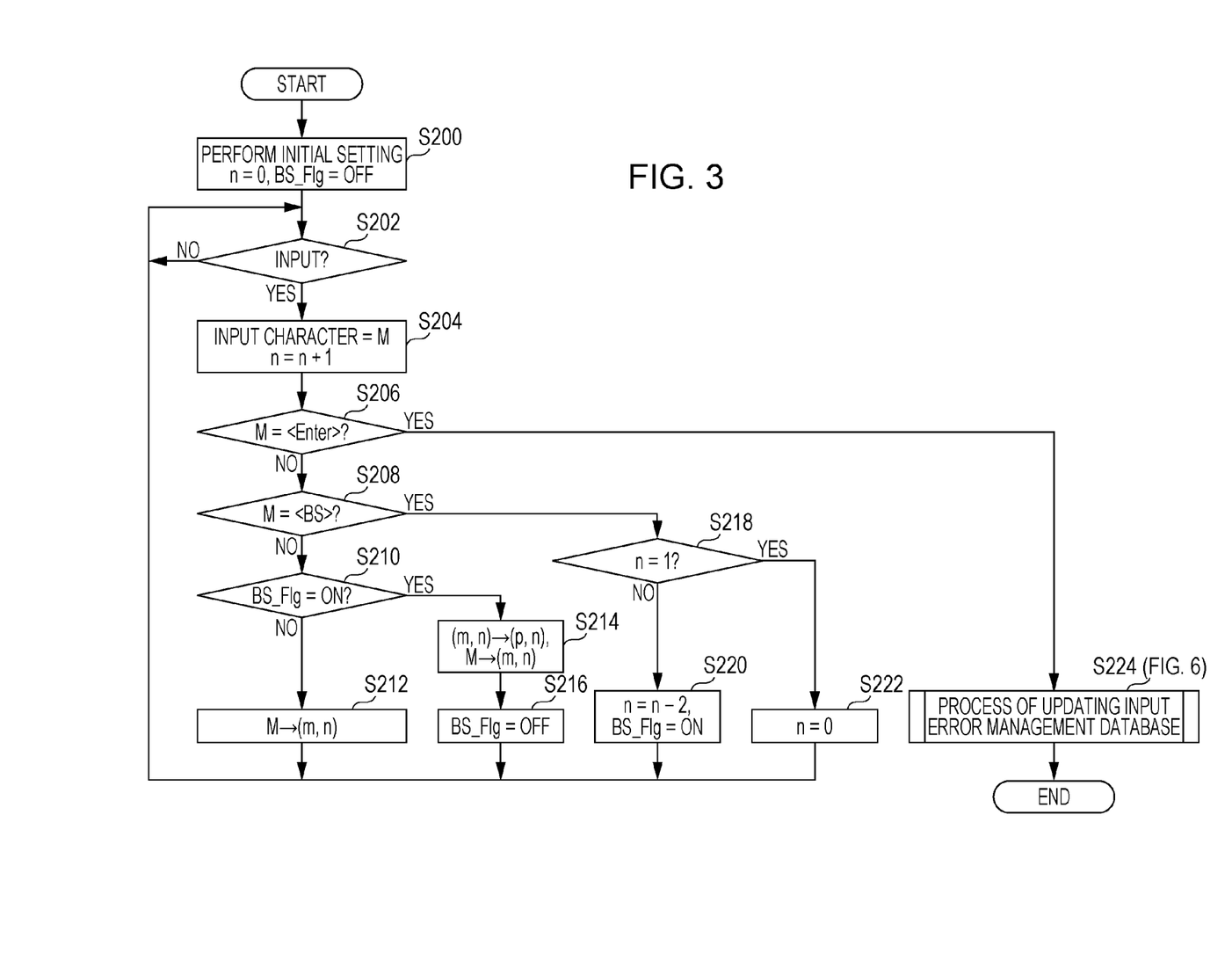
FIG. 3 is an example of a flowchart illustrating the flow of a password input process performed by the authentication device.

Then, the authentication device 1 performs a password input process (S102; refer to FIG. 3).

FIG. 3 is an example of a flowchart illustrating the flow of the password input process performed by the authentication device 1.

First, the authentication device 1 sets the number of characters (or digits) n to zero and BS_Flg to OFF, as the initial setting (S200). The number of characters n is a value indicating what number character the current character is in a password, and BS_Flg is a flag indicating that a BS key, that is, a backspace key has just been pressed. These data are stored in the memory device 18, for example. The length of the registered password is stored in the storage device 16 as a value N.

Then, the authentication device 1 waits until input to the keyboard 32 is made (S202).

Upon input to the keyboard 32, the authentication device 1 stores an input character M in the memory device 18, for example, and increments the number of characters n by one (S204). Hereinafter, the term "character" will include both characters in a narrow sense and digits.

Then, the authentication device 1 determines whether the input character M is a character input using the Enter key (S206).

If the input character M is not a character input using the Enter key, then the authentication device 1 determines whether the input character M is a character input using the BS key, that is, the backspace key (S208).

Figure 4:
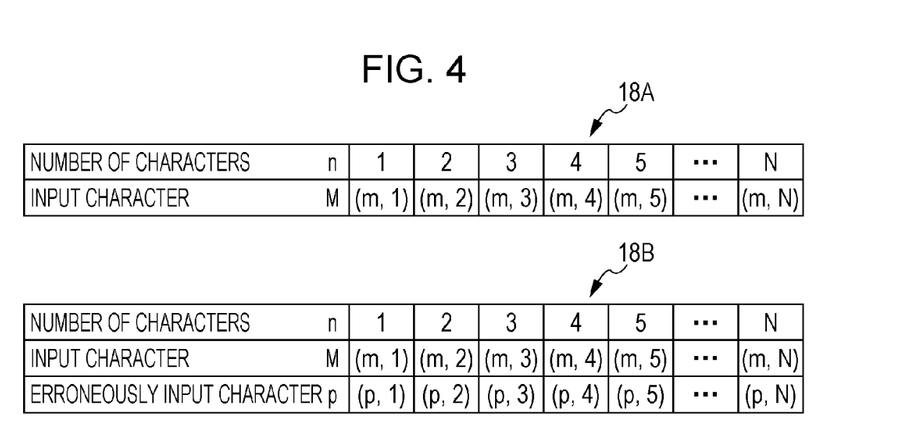
FIG. 4 illustrates an example of data structures of an input data array and an input error temporary management database.

If the input character M is neither a character input using the Enter key nor a character input using the backspace key, that is, if an ordinary character input is made, the authentication device 1 determines whether BS_Flg is ON (S210). If BS_Flg is OFF, the authentication device 1 stores the input character M in the n-th cell (m, n) of the input data array 18A [(m, n); n=one to N] (S212). FIG. 4 illustrates an example of data structures of the input data array 18A and the input error temporary management database 18B. If BS_Flg is ON, that is, if the previous input is made using the backspace key, the authentication device 1 copies the n-th cell (m, n) of the input data array 18A into the n-th cell (p, n) of the input error temporary management database 18B. The authentication device 1 stores the input character M in the n-th cell (m, n) of the input data array 18A (S214). Then, the authentication device 1 changes BS_Flg to OFF (S216), and returns to S202.

If the input character M is a character input using the backspace key, the authentication device 1 determines whether the number of characters is one (S218). If the number of characters n is not one, the authentication device 1 decrements the number of characters n by two and changes BS_Flg to ON (S220), and returns to S202. If the number of characters n is one, the authentication device 1 returns the number of characters n to zero (S222), and returns to S202.

Figure 6:
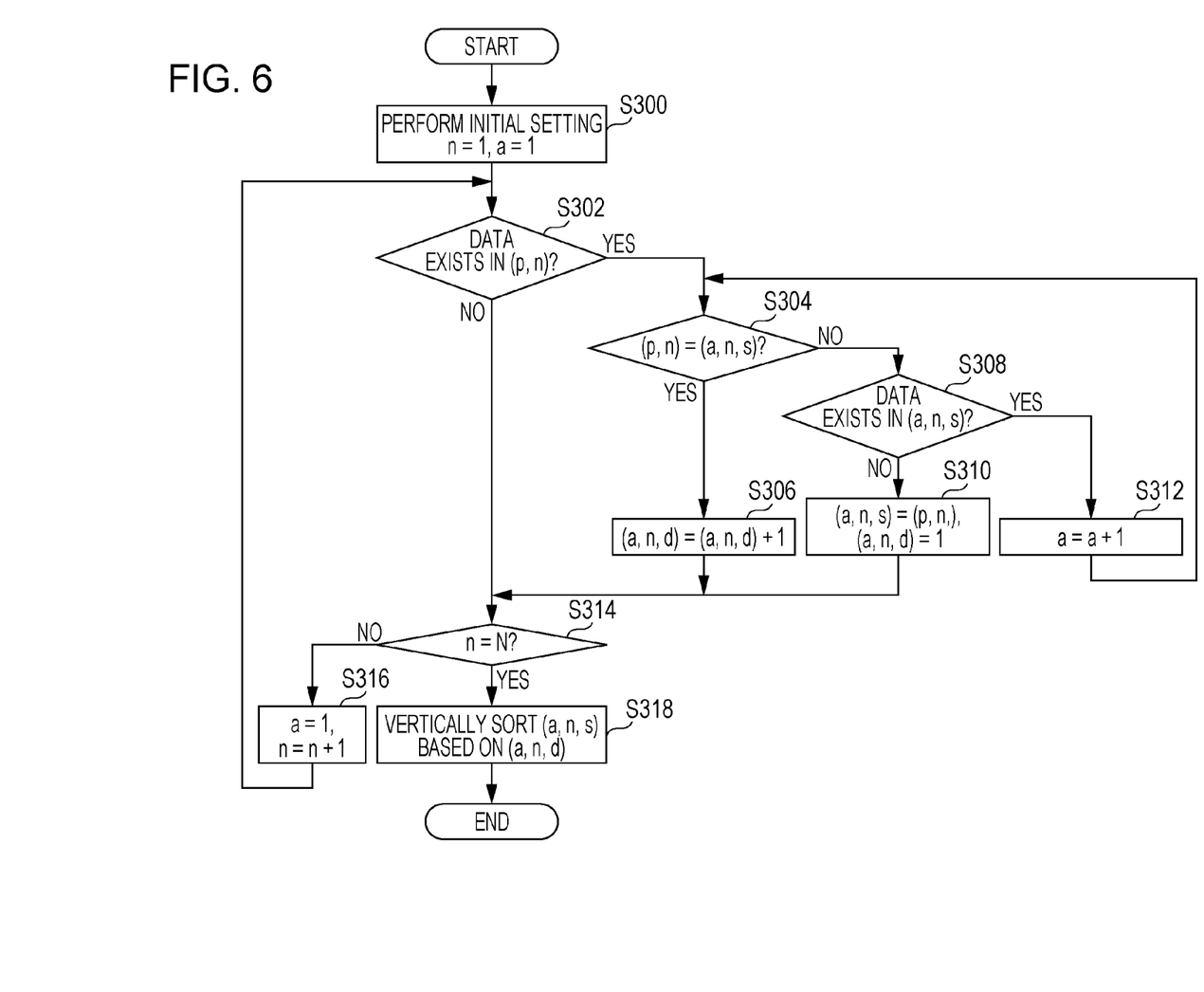
FIG. 6 is an example of a flowchart illustrating the flow of a process of updating the input error management database performed by the authentication device.

If the input character M is a character input using the Enter key, the authentication device 1 determines that an operation of determining the input password has been performed, and causes the content of the input error temporary management database 18B to be reflected in the input error management database 16C (S224; refer to FIG. 6). That is, the authentication device 1 performs a process of updating the input error management database 16C, and completes the process of the flowchart of FIG. 3.

Figure 5:
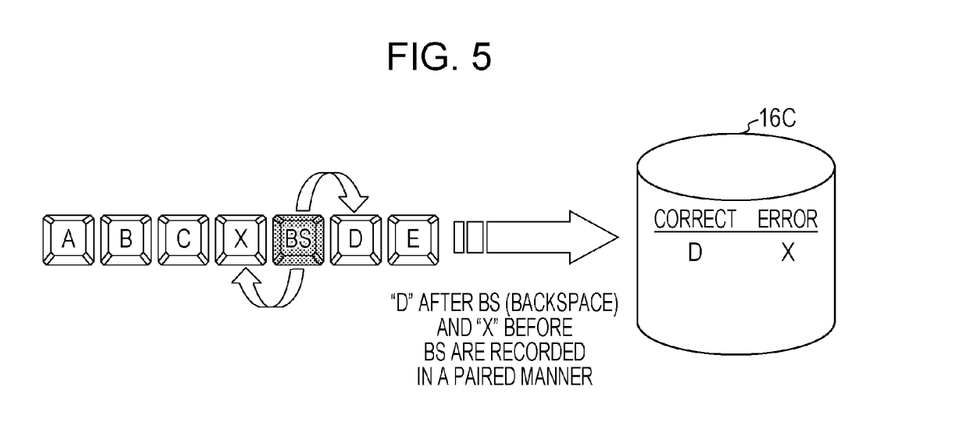
FIG. 5 is an illustration for explaining a pair of input characters registered into the input error temporary management database by execution of the process of the flowchart of FIG. 3.

FIG. 5 is an illustration for explaining a pair of input characters registered into the input error temporary management database 18B by execution of the process of the flowchart of FIG. 3. As illustrated in FIG. 5, when a user inputs characters in the order A→B→C→X→BS (backspace)→D→E, it is inferred that the fourth character X is an error and the right character is D. In this case, in the input error temporary management database 18B, the right input character D is stored in cell (m, 4), and the erroneously input character X is stored in cell (p, 4).

Figure 7:
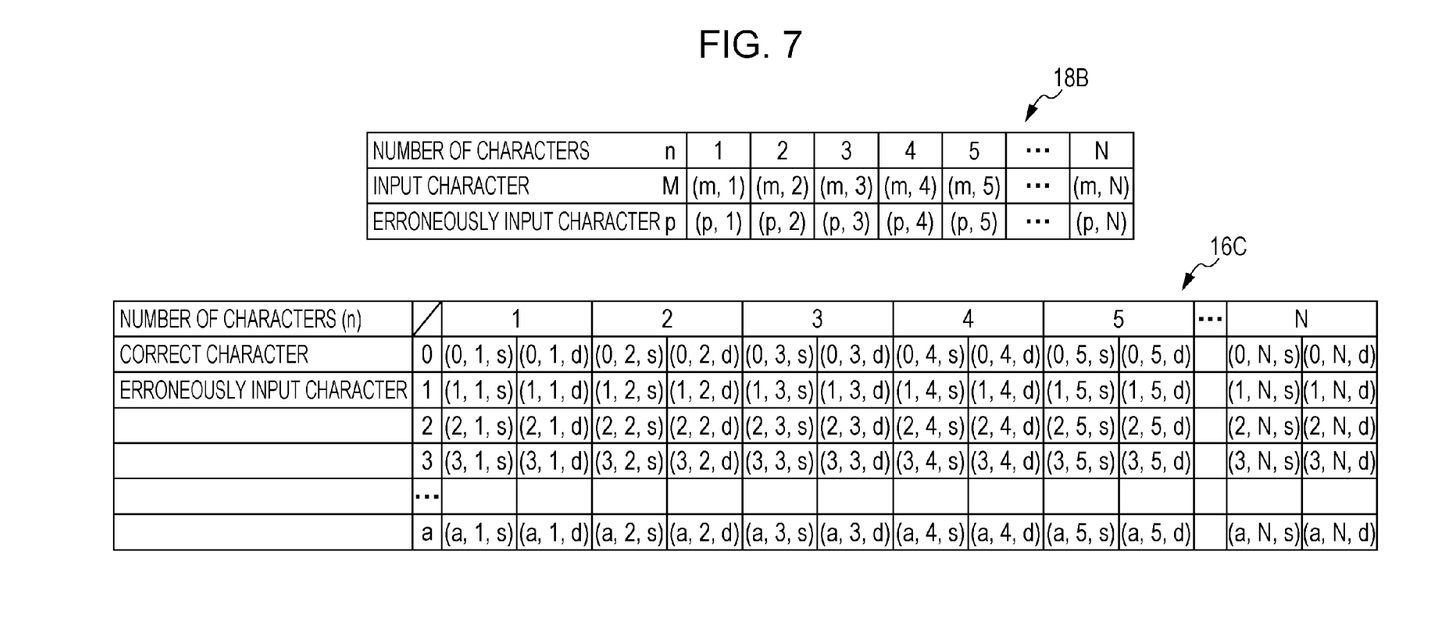
FIG. 7 exemplifies data structures of the input error temporary management database and an input error management database.

FIG. 6 is an example of a flowchart illustrating the flow of the process of updating the input error management database 16C performed by the authentication device 1. The process of the flowchart of FIG. 6 is executed by the input error management unit 10B. Also, FIG. 7 exemplifies the data structures of the input error temporary management database 18B and the input error management database 16C. In the input error management database 16C, the correct character (0, n, s) and the past erroneously input characters (a, n, s) are stored in association with each other for each character number n of the registered password. The parameter a is a value indicating that the smaller the value, the larger the number of occurrences of an input error. The past erroneously input characters are sorted based on the respective numbers of occurrences of an input error (a, n, d) in such a way that the larger the number of occurrences of an input error, the higher (a is smaller) the erroneously input character is ranked.

As the process of the flowchart illustrated in FIG. 6 begins, the authentication device 1 sets the number of characters n to one and the parameter a to one, as the initial setting (S300).

Then, the authentication device 1 determines whether data exists in cell (p, n) in the input error temporary management database 18B (S302).

If data exists in cell (p, n) in the input error temporary management database 18B, the authentication device 1 determines whether cell (p, n) matches cell (a, n, s) in the input error management database 16C (S304). If cell (p, n) matches cell (a, n, s), the authentication device 1 increments the number of occurrences of an input error (a, n, d) by one (S306).

If cell (p, n) does not match cell (a, n, s), the authentication device 1 determines whether data exists in cell (a, n, s) (S308). If data does not exist in cell (a, n, s), the authentication device 1 newly adds the character of cell (p, n) to cell (a, n, s), and sets the number of occurrences of an input error (a, n, d) to one (S310). If data exists in cell (a, n, s), the authentication device 1 increments the parameter a by one (S312), and returns to S304.

In S302, if it is determined that data does not exist in cell (p, n), or after the operation of S306 or S308, the authentication device 1 determines whether the number of characters n matches the length N of the registered password (S314).

If the number of characters n does not match the length N of the registered password, the authentication device 1 returns to S302. Otherwise, the number of characters n matches the length N of the registered password, the authentication device 1 vertically sorts the characters (a, n, s) of character numbers in such a way that the larger the number of occurrences of an input error (a, n, d), the higher (a is smaller) the character (a, n, s) is ranked (S318), and completes the process of the flowchart of FIG. 6.

With reference back to FIG. 2, the description of the flow of the entire process will be continued. Upon completion of the password input process described with reference to FIG. 3 and FIG. 6, the authentication device 1 determines whether the input password matches the registered password (S104). If the input password matches the registered password, the authentication device 1 performs login processing (S106), and completes the process of the flowchart of FIG. 2. After the login processing, application programs and so forth a user desires to use are available.

Figure 8:
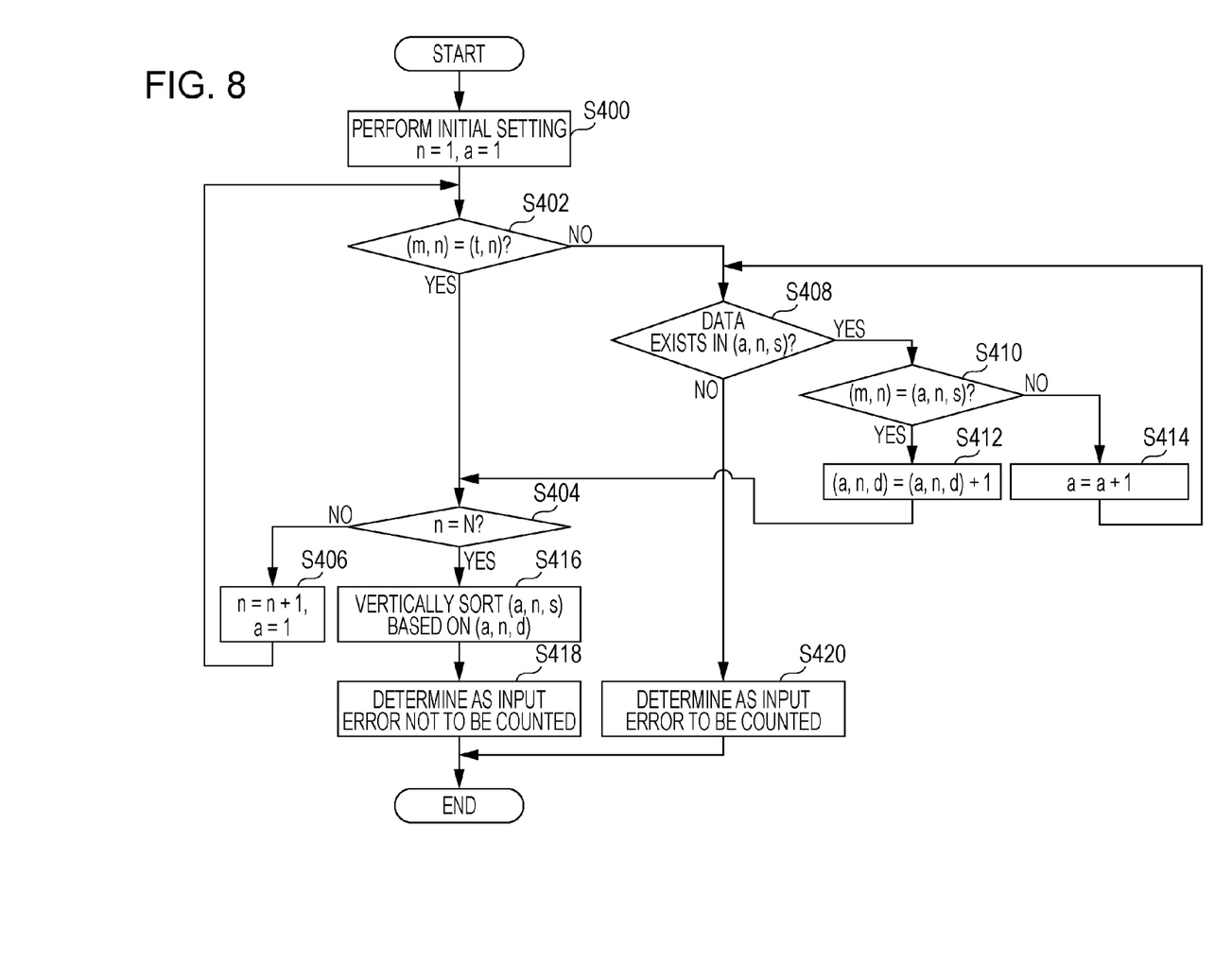
FIG. 8 is an example of a flowchart illustrating the flow of a process of verification against the input error management database performed by the authentication device.

Otherwise, if the input password does not match the registered password, the authentication device 1 performs a process of verification against the input error management database 16C (S108; refer to FIG. 8).

Figure 9:
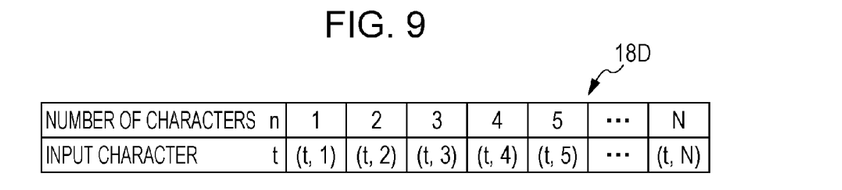
FIG. 9 is an example of a data structure of a registered password.

FIG. 8 is an example of a flowchart illustrating the flow of the process of verification against the input error management database 16C performed by the authentication device 1. The process of the flowchart of FIG. 8 is executed by the input error management unit 10B. Also, FIG. 9 is an example of a data structure of a registered password 16D. The registered password 16D has a data structure that supports every character indicated by the number of characters n and in which a correct character (t, n) is stored, for example.

As the process of the flowchart of FIG. 8 begins, the authentication device 1 sets the number of characters n to one and the parameter a to one, as the initial setting (S400).

Then, the authentication device 1 determines whether the n-th character (m, n) of the input password matches the n-th character (t, n) of the registered password (S402).

If the n-th character (m, n) of the input password matches the n-th character (t, n) of the registered password, the authentication device 1 determines whether the number of characters n matches the value N (S404). If the number of characters n does not match the value N, the authentication device 1 increments the number of characters n by one, and sets the parameter a to one (S406), and returns to S402.

If the n-th character (m, n) of the input password does not match the n-th character (t, n) of the registered password, the authentication device 1 determines whether data exists in cell (a, n, s) (S408).

If data exists in cell (a, n, s), the authentication device 1 determines whether the n-th character (m, n) of the input password matches a character stored in cell (a, n, s) of the input error management database 16C (S410). If the character (m, n) matches the character in cell (a, n, s), the authentication device 1 increments the number of occurrences of an input error (a, n, d) of the target character by one (S412), and proceeds to S404.

If the character (m, n) does not match the character in cell (a, n, s), the authentication device 1 increments the parameter a by one, and returns to S408.

If it is determined in S404 that the number of characters n matches the value N, the authentication device 1 vertically sorts the characters (a, n, s) of character numbers in such a way that the larger the number of occurrences of an input error (a, n, d), the higher (a is smaller) the character (a, n, s) is ranked (S416). Then, the authentication device 1 determines that the target input error is an "input error not to be counted" the number of which is not included in the specified number of mismatches to be counted (S418), and completes the process of the flowchart of FIG. 8. The operation of S416 and the operation of S 418 are performed when all the characters (m, n) of the input password match the corresponding characters (t, n) of the registered password or characters (a, n, s) stored in the input error management database 16C.

Otherwise, it is determined in S408 that data does not exist in cell (a, n, s), the authentication device 1 determines that the target input error is an "input error to be counted" the number of which is included in the specified number of mismatch determinations (S420), and completes the process of the flowchart of FIG. 8. The operation of S420 is performed when any character (m, n) of the input password matches neither the corresponding character (t, n) of the registered password nor the character stored in the character (a, n, s) stored in the input error management database 16C.

Figure 10:
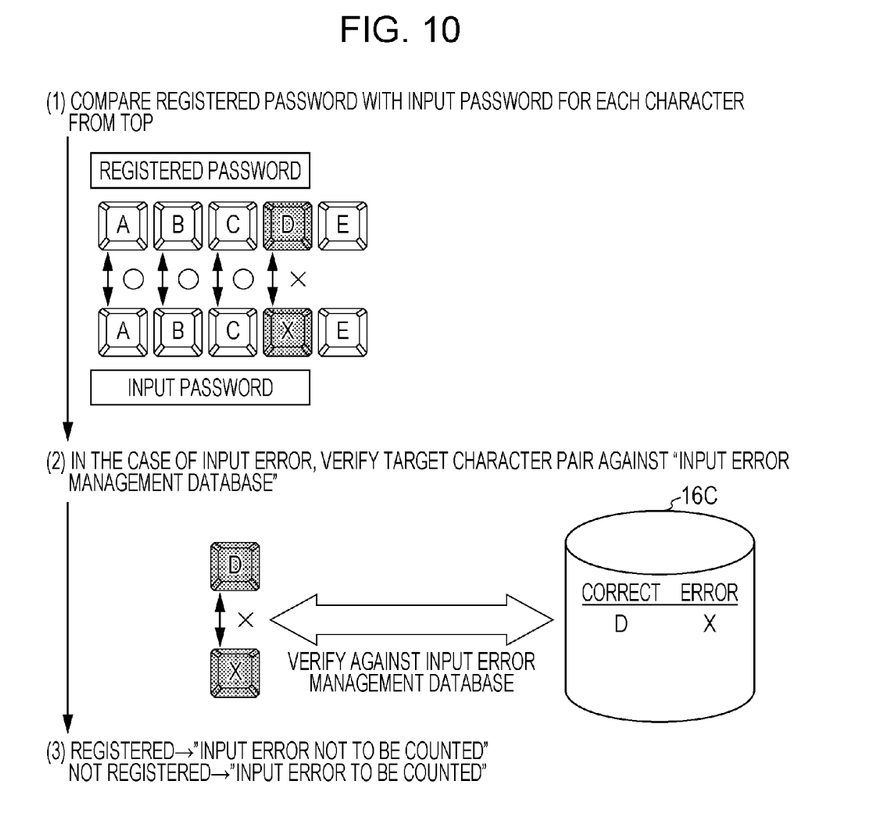
FIG. 10 schematically illustrates a manner in which whether the target input error is an "input error not to be counted" or an "input error to be counted" is determined by execution of the process of the flowchart illustrated in FIG. 8.

FIG. 10 schematically illustrates a manner in which whether the target input error is an "input error not to be counted" or an "input error to be counted" is determined by execution of the process of the flowchart illustrated in FIG. 8. As illustrated in FIG. 10, when the character of each character number matches the corresponding character (t, n) of the registered password or the character (a, n, s) stored in the input error management database 16C, the target input error is determined as an "input error not to be counted".

With reference back to FIG. 2, the description of the flow of the entire process will be continued. Upon completion of the process of verification against the input error management database 16C described with reference to FIG. 8, the authentication device 1 determines whether a determination result of an "input error not to be counted" has been obtained (S110). If the determination result of the "input error not to be counted" has been obtained, the authentication device 1 returns to S102, and performs again the password input process.

Otherwise, if a determination result of an "input error to be counted" has been obtained, the authentication device 1 decrements the value T by one (S112), and then determines whether the value T has become zero (S114). If the value T has not become zero, the authentication device 1 returns to S102, and performs again the password input process. If the value T has become zero, the authentication device 1 does not permit login. In this case, the authentication device 1 invalidates the password and performs processing that requests a user to reset a password in a predetermined procedure, for example.

Note that the operations of S104, S106, S112, S114, and S116 in the flowchart of FIG. 2 are executed by the password authentication unit 10A, for example, and the operations of other steps are executed by the input error management unit 10B, for example.

As a result of the processes described above, information on characters that are likely to be erroneously input by a user is stored in the input error management database 16C. Then, if only erroneously input characters that are the same as the characters stored in the input error management database 16C are included in a password input by the user, the counting of the specified number of mismatches will be canceled. Thereby, when a user makes an input error for a character that is likely to be erroneously input by the user, it is possible for the user to repeatedly reenter the character. This improves convenience. On the other hand, it is difficult for a malicious third party to infer a character that is likely to be erroneously input by a legitimate user. Therefore, even if counting of the number of times it is determined that passwords do not match is in part cancelled, the reduction in security level is small. Accordingly, the authentication device 1 of this embodiment may improve convenience while maintaining the security level.

Also, the authentication device 1 of this embodiment creates and updates the input error management database 16C as a list of input errors for each of the characters or digits constituting the registered password. Therefore, the input error management database 16C is a database in which the characters or digits that are likely to be erroneously input by a user are sufficiently reflected. As a result, the authentication device 1 of this embodiment may further improve convenience.

Also, the input error corrected by using the backspace key is reflected in the input error management database 16C. Therefore, when a certain input error is made for the first time at the determination stage of password input, the input error is in some cases not included in the specified number of mismatches to be counted. Such a scene occurs, for example, in the case where after a certain input error is made, the error is corrected by using the backspace key, and, at the time of login made several times later, the same input error is detected at the determination stage. In this scene, if the input error management database 16C was created and updated only on the basis of a comparison between a temporarily determined input password and the registered password, the first input error would be included in the specified number of mismatches to be counted. In contrast to this, the authentication device 1 of this embodiment causes the input error corrected by using the backspace key to be reflected in the input error management database 16C. Therefore, even with the first input error at the determination stage, the count of the specified number of mismatches is canceled in some cases. As a result, the authentication device 1 of this embodiment may further improve convenience.

With the authentication device 1 of this embodiment described above, convenience may be improved for a user.

Note that the authentication device 1 of the first embodiment may cause corrected input errors to be reflected in the input error management database 16C, for example, in the case where correction by using the <←->+<Delete> keys is made as well as in the case where correction by using the backspace key is made.

Also, the authentication device 1 of the first embodiment may determine whether the target input error is an "input error not to be counted" for not all the input errors stored in the input error management database 16C but a limited number of those having a higher number of occurrences. In this case, the process of the flowchart of FIG. 11, for example, is executed instead of the process of the flowchart of FIG. 8.

Figure 11:
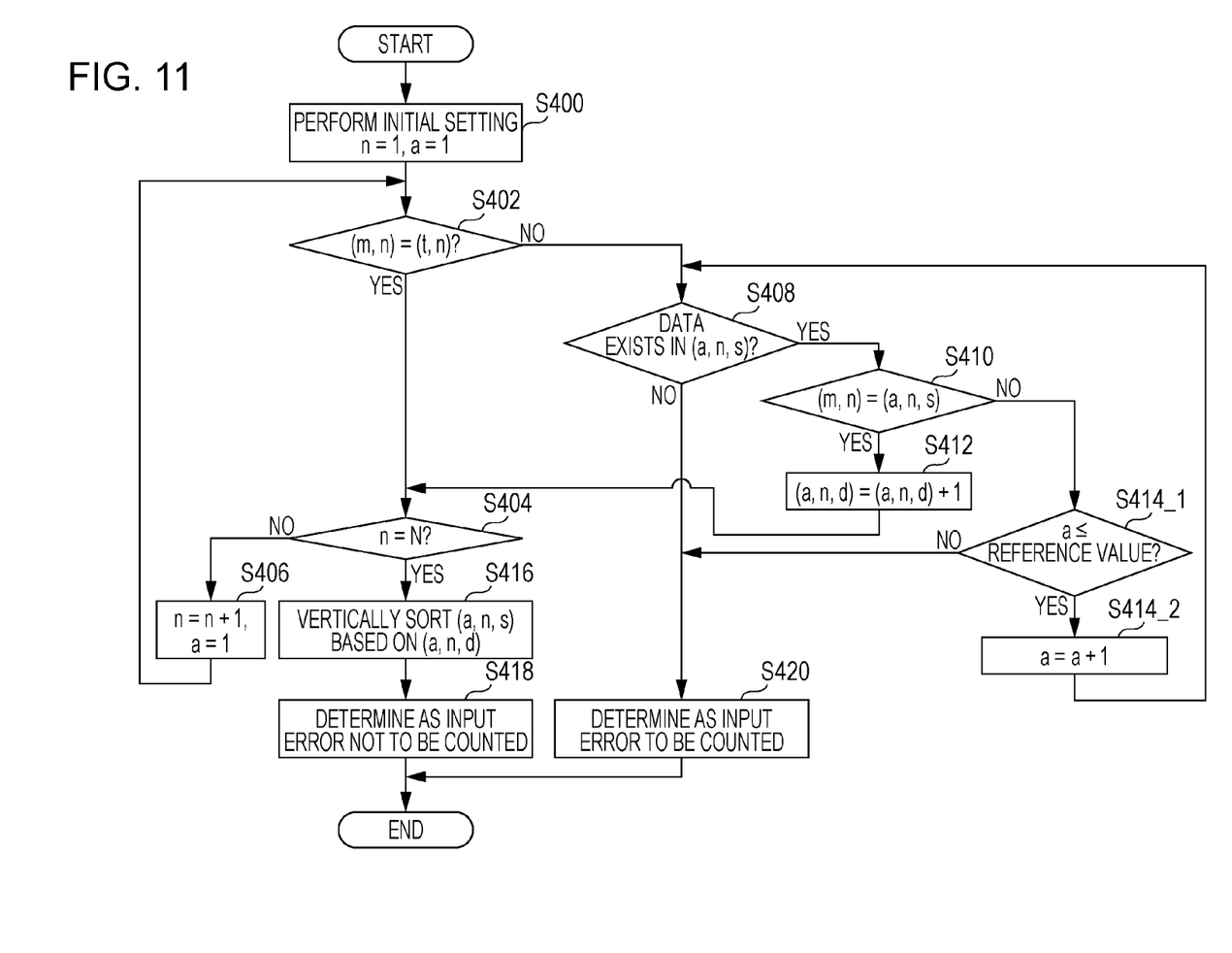
FIG. 11 is another example of the flowchart illustrating the flow of the process of verification against the input error management database performed by the authentication device.

FIG. 11 is another example of the flowchart illustrating the flow of the process of verification against the input error management database 16C performed by the authentication device 1. Here, only differences (S414_1 to S414_2) from the flowchart of FIG. 8 will be described.

If it is determined in S410 that the character (m, n) does not match the character in cell (a, n, s), the authentication device 1 determines whether the parameter a is equal to or less than a reference value (about two, for example) (S414_1). If the parameter a is equal to or less than the reference value, the authentication device 1 increments the parameter a by one (S414_2), and returns to S408. Otherwise, if the parameter a exceeds the reference value, the authentication device 1 determines the target input error is an "input error to be counted" (S420), and completes the process of the flowchart of FIG. 11.

Thus, the authentication device 1 determines the target input error to be an "input error not to be counted" if the target input error is an input error the number of occurrences of which is ranked from top to the (reference value+1)-th, and determines the target input error to be an "input error to be counted" if the target input error is an input error the number of occurrences of which is ranked low. As a result, as compared with the case where the process of the flowchart illustrated in FIG. 8 is executed, the security level improves and a user is put at a slight disadvantage in terms of the counting of the specified number of mismatches.

Second Embodiment

Hereinafter, an authentication device 2 according to a second embodiment will be described. The authentication device 2 according to the second embodiment has a configuration in common with the first embodiment, and therefore elements will be denoted by the same reference characters and will be described.

An input error management unit 10B according to the second embodiment presents in advance a character input challenge to a user, and creates and updates the input error management database 16C on the basis of an input error that occurs when a user makes input in order to address the challenge. This challenge includes inputting characters that form the registered password. Note that the authentication device 2 according to the second embodiment, as in the first embodiment, may cause an input error occurring in an event of actual password input to be reflected in the input error management database 16C. Accordingly, the same processing as in the first embodiment may be performed for processes other than the process of updating the input error management database 16C.

Figure 12:
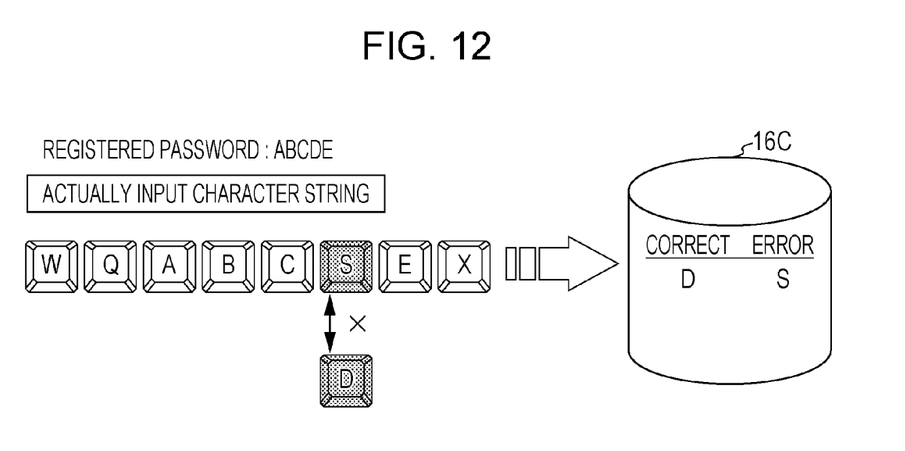
FIG. 12 schematically illustrates a manner in which an input challenge including input of a registered password is presented and an input error is reflected in the input error management database.

FIG. 12 schematically illustrates a manner in which an input challenge including input of a registered password is presented and an input error is reflected in the input error management database 16C.

Figure 13:
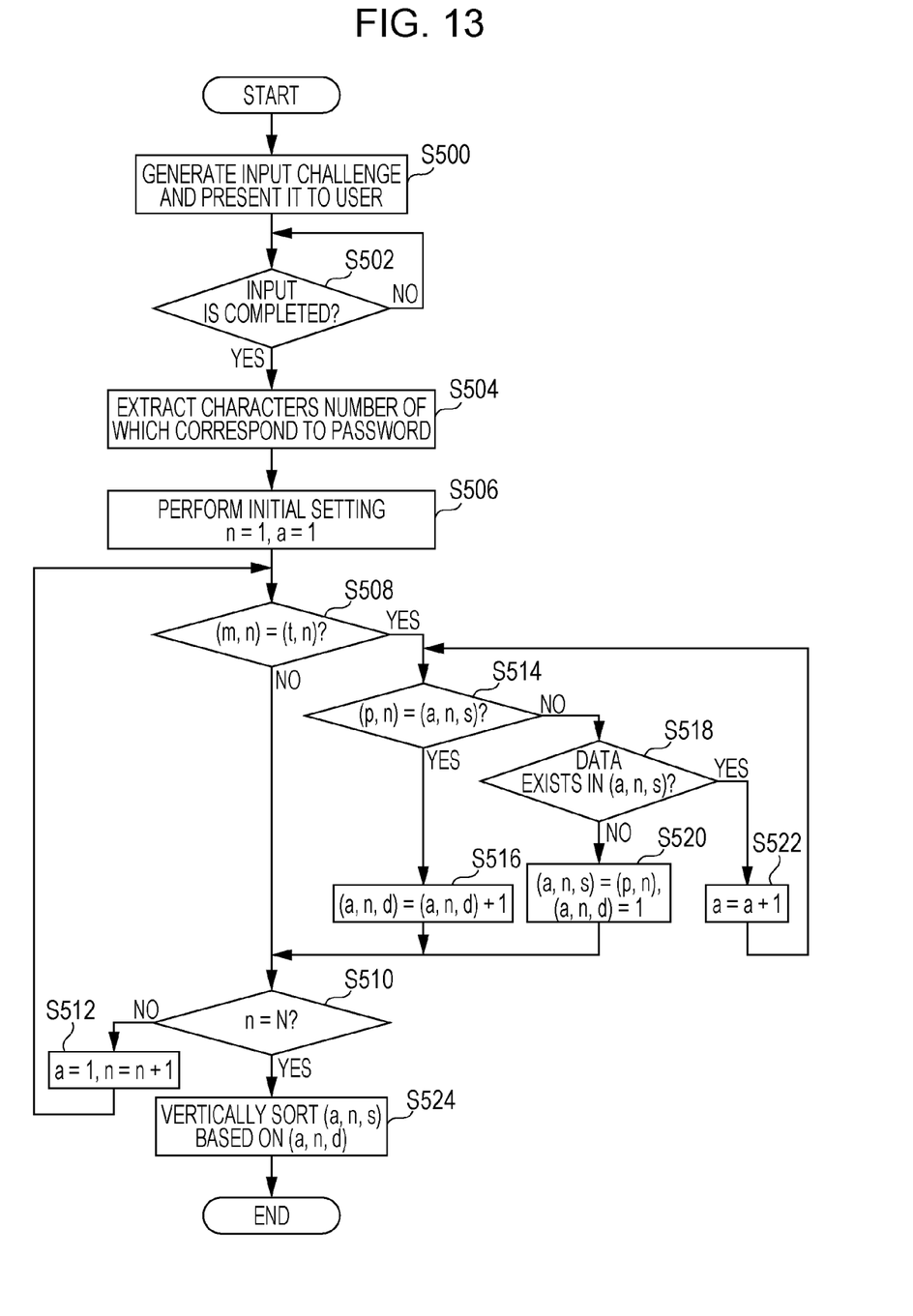
FIG. 13 is an example of a flowchart illustrating the flow of a process of updating the input error management database performed by an authentication device.

FIG. 13 is an example of a flowchart illustrating the flow of a process of updating the input error management database 16C performed by the authentication device 2. The process of the flowchart of FIG. 13 may begin at an arbitrary timing, and may be performed repeatedly, not only once.

First, the authentication device 2 generates a random input challenge including input of a password, and presents the challenge to a user by using the display device 30 or the like (S500).

Then, the authentication device 2 waits until the user completes inputting characters the number of which is included in the input challenge (S502). Upon completion of the input, the authentication device 2 extracts characters the number of which correspond to the number of characters of a password included in the input challenge, from a character string input by the user, and stores the characters as the input data array 18A [(m, n); n=one to N], as in the first embodiment, in the memory device 18, for example (S504).

Then, the authentication device 2 sets the number of characters n to one, and the parameter a to one as the initial setting (S506).

Then, the authentication device 2 determines whether the n-th character (m, n) of the input password matches the n-th character (t, n) of the registered password (S508).

If the n-th character (m, n) of the input password matches the n-th character (t, n) of the registered password, the authentication device 2 determines whether the number of characters n matches the value N (S510). If the number of characters n does not match the value N, the authentication device 2 increments the number of characters n by one and set the parameter a to one (S512), and returns to S508.

If the n-th character (m, n) of the input password does not match the n-th character (t, n) of the registered password, the authentication device 2 determines whether cell (p, n) matches cell (a, n, s) in the input error management database 16C (S514). If cell (p, n) matches cell (a, n, s), the authentication device 2 increments the number of occurrences of an input error (a, n, d) by one (S516), and proceeds to S510.

If cell (p, n) does not match cell (a, n, s), the authentication device 2 determines whether data exists in cell (a, n, s). If data does not exists in cell (a, n, s), the authentication device 2 newly adds the character of cell (p, n) into cell (a, n, s), and sets the number of occurrences of an input error (a, n, d) to one (S520). If data exists in cell (a, n, s), the authentication device 2 increments the parameter a by one (S522), and returns to S514.

It is determined in S510 that the number of characters n matches the length N of the registered password, the authentication device 2 vertically sorts the characters (a, n, s) of character numbers in such a way that the larger the number of occurrences of an input error (a, n, d), the higher (a is smaller) the character (a, n, s) is ranked (S524), and completes the process of the flowchart of FIG. 13.

The authentication device 2 of this embodiment described above, as in the first embodiment, it is possible to improve convenience while maintaining the security level.

Also, the input error management database 16C is created and updated on the basis of a result obtained by presenting an input challenge in advance and making input. Therefore, even with the first input error at the determination stage of password input, counting of the specified number of mismatches is not made in some cases. As a result, the authentication device 2 of this embodiment may further improve convenience.

Note that, in the first and second embodiments, the input interface 22, the keyboard 32, and the mouse 34, or some of these components are included in examples of the "input unit". Also, the password authentication unit 10A is included in examples of the "authentication unit", and the input error management unit 10B is included in examples of the "management unit".

As described above, although the forms for carrying out the present disclosure have been described using the embodiments, the present disclosure is not limited to such embodiments at all, and various modifications and replacements may be made without departing from the scope of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An authentication device comprising:
    a storage device configured to store a registered password associated with an authentication; and
    a hardware processor configured to execute instructions that, in response to execution by the hardware processor, cause the authentication device to perform operations, the operations comprising:
        receiving input;
        creating, based on a history of errors received in the input, an input error list supporting each of characters, digits, or other elements included in the registered password;
        causing the input error list to be stored in the storage device;
        receiving, as input, an input error and a given correction operation that corrects the input error;
        causing the input error to be included in the input error list in response to the input error being corrected by the given correction operation;
        determining that an input password received as input mismatches the registered password stored in the storage device;
        determining, based on the input error list, that a cause of the input password mismatching the registered password is due to the input error that is included in the input error list;
        in response to the input error being included in the input error list, not counting the mismatching of the input password with the registered password in a number of times received input is determined as mismatching the registered password;
        counting the number of times it is determined that input mismatches the registered password; and
        performing authentication with respect to the registered password in response to receiving, as input, a matching password that matches the registered password and in response to the number of times being less than a specified number of input mismatches with respect to the registered password.

2. The authentication device according to claim 1, wherein the operations further comprise ranking the input error list based on a number of occurrences of one or more input errors for each of the characters, digits, or other elements included in the registered password, and
    wherein determining that the cause of the input password mismatching the registered password is due to the input error is based on a ranking of the input error in the input error list.

3. The authentication device according to claim 1, wherein the operations further comprise
    creating the input error list based on one or more input errors for one or more characters or digits corresponding to the registered password in a string of characters or digits received as input.

4. An authentication method performed by an authentication device, the method comprising:
    receiving input;
    creating, based on a history of errors received in the input, an input error list supporting each of characters, digits, or other elements included in a registered password registered in advance in a storage device;
    receiving, as input, an input error and a given correction operation that corrects the input error;
    causing the input error to be included in the input error list in response to the input error being corrected by the given correction operation;
    determining that an input password received as input mismatches the registered password;
    determining, based on the input error list, that a cause of the input password mismatching the registered password is due to the input error that is included in the input error list;
    in response to the input error being included in the input error list, not counting the mismatching of the input password with the registered password in a number of times received input is determined as mismatching the registered password;
    counting the number of times it is determined that input mismatches the registered password; and
    performing authentication with respect to the registered password in response to receiving, as input, a matching password that matches the registered password and in response to the number of times being less than a specified number of input mismatches with respect to the registered password.

5. The authentication method according to claim 4, further comprising:
    ranking the input error list based on a number of occurrences of one or more input errors for each of the characters, digits, or other elements included in the registered password, and
    wherein determining that the cause of the input password mismatching the registered password is due to the input error is based on a ranking of the input error in the input error list.

6. The authentication method according to claim 4, further comprising:
    creating the input error list based on one or more input errors for one or more characters or digits corresponding to the registered password in a string of characters or digits received as input.

7. A non-transitory computer-readable recording medium having stored therein a program for causing a computer of an authentication device to execute operations, the operations comprising:
  receiving input;
  creating, based on a history of errors received in the input, an input error list supporting each of characters, digits, or other elements included in a registered password registered in advance in a storage device;
  receiving, as input, an input error and a given correction operation that corrects the input error;
  causing the input error to be included in the input error list in response to the input error being corrected by the given correction operation;
  determining that an input password received as input mismatches the registered password stored in the storage device;
  determining, based on the input error list, that a cause of the input password mismatching the registered password is due to the input error that is included in the input error list;
  in response to the input error being included in the input error list, not counting the mismatching of the input password with the registered password in a number of times received input is determined as mismatching the registered password;
  counting the number of times it is determined that input mismatches the registered password; and
  performing authentication with respect to the registered password in response to receiving, as input, a matching password that matches the registered password and in response to the number of times being less than a specified number of input mismatches with respect to the registered password.

8. The non-transitory computer-readable recording medium according to claim 7,
  wherein the operations further comprise ranking the input error list based on a number of occurrences of one or more input errors for each of the characters, digits, or other elements included in the registered password, and
  wherein determining that the cause of the input password mismatching the registered password is due to the input error is based on a ranking of the input error in the input error list.

9. The non-transitory computer-readable recording medium according to claim 7,
  wherein the operations further comprise creating the input error list based on one or more input errors for one or more characters or digits corresponding to the registered password in a string of characters or digits received as input.

* * * * *